US011671536B2

(12) United States Patent
Navarro et al.

(10) Patent No.: US 11,671,536 B2
(45) Date of Patent: *Jun. 6, 2023

(54) METHOD AND SYSTEM FOR PROVIDING ACCESS TO A NODE OF A SHARED RESOURCE

(71) Applicant: The Toronto-Dominion Bank, Toronto (CA)

(72) Inventors: Miguel Navarro, Ewing, NJ (US); Levi Sutter, Westampton, NJ (US); Joseph S. Sansotta, Langhorne, PA (US); Mohamed Abbas, Jersey City, NJ (US); Lina Nancy Siciliano, Voorhees, NJ (US); Joseppina Stankiewicz, Medford, NJ (US); Catherine Halloran, Cherry Hill, NJ (US); Robert Setlight, Robbinsville, NJ (US); Matthew J. Maietta, Freehold, NJ (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/886,541

(22) Filed: Aug. 12, 2022

(65) Prior Publication Data

US 2022/0385762 A1 Dec. 1, 2022

Related U.S. Application Data

(63) Continuation of application No. 17/186,515, filed on Feb. 26, 2021, now Pat. No. 11,451,669.

(51) Int. Cl.
*H04M 3/00* (2006.01)
*H04M 3/523* (2006.01)
*G06Q 10/0631* (2023.01)

(52) U.S. Cl.
CPC .... *H04M 3/5238* (2013.01); *G06Q 10/06311* (2013.01); *H04M 3/5234* (2013.01); *H04M 2203/402* (2013.01); *H04M 2203/404* (2013.01)

(58) Field of Classification Search
CPC ............ H04M 3/5238; H04M 3/5234; H04M 2203/402; H04M 2203/404; G06Q 10/06311

(Continued)

(56) References Cited

U.S. PATENT DOCUMENTS 7,720,091 B2    5/2010 Faber et al.
7,783,755 B2    8/2010 Goss et al.
(Continued)

*Primary Examiner* — William J Deane, Jr.
(74) *Attorney, Agent, or Firm* — Rowand LLP

(57) ABSTRACT

A computer server system comprises a communications module; a processor coupled with the communications module; and a memory coupled to the processor and storing processor-executable instructions which, when executed by the processor, configure the processor to receive, via the communications module and from a first device, a signal including a request to schedule access to a shared resource within a time window; identify, based on a load projection for the shared resource, at least one time period within the time window for the access to the shared resource; send, via the communications module and to the first device, a signal including the at least one time period and requesting confirmation that a particular one of the at least one time period is acceptable; receive, via the communications module and from the first device, a signal including confirmation that the particular one of the at least one time period is acceptable; determine that a current time has reached the particular one of the at least one time period; and responsive to determining that the current time has reached the particular one of the at least one time period, provide access to a node of the shared resource, the node having available bandwidth.

20 Claims, 9 Drawing Sheets

(58) Field of Classification Search
USPC ....... 379/265.01–265.14, 266.01–266.1, 309
See application file for complete search history.

(56) References Cited

U.S. PATENT DOCUMENTS

| | | |
|---|---|---|
| 8,233,611 B1 | 7/2012 | Zettner |
| 9,648,170 B2 | 5/2017 | Dhir et al. |
| 10,277,742 B2 | 4/2019 | Anisimov et al. |
| 10,649,914 B1* | 5/2020 | Caccamo .............. G06F 9/5077 |
| 11,039,001 B2 | 6/2021 | Oh et al. |
| 2013/0260686 A1 | 10/2013 | Mukherjee |
| 2015/0163324 A1* | 6/2015 | Bolotin ................... H04L 67/63 |
| | | 709/225 |
| 2017/0147249 A1* | 5/2017 | Hower ................. G06F 12/084 |
| 2019/0205772 A1* | 7/2019 | Kohlmeier ....... G06Q 10/06311 |

* cited by examiner

METHOD AND SYSTEM FOR PROVIDING ACCESS TO A NODE OF A SHARED RESOURCE

CROSS-REFERENCE TO RELATED APPLICATIONS

This application is a continuation of U.S. patent application Ser. No. 17/186,515 filed on Feb. 26, 2021, the entire contents of which are incorporated herein by reference.

TECHNICAL FIELD

The present application relates to methods and systems for providing access to a node of a shared resource.

BACKGROUND

Shared resources often have nodes that may be accessed by a requesting party. It may be difficult to schedule or otherwise provide access to the nodes as the shared resource may have limited bandwidth availability.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
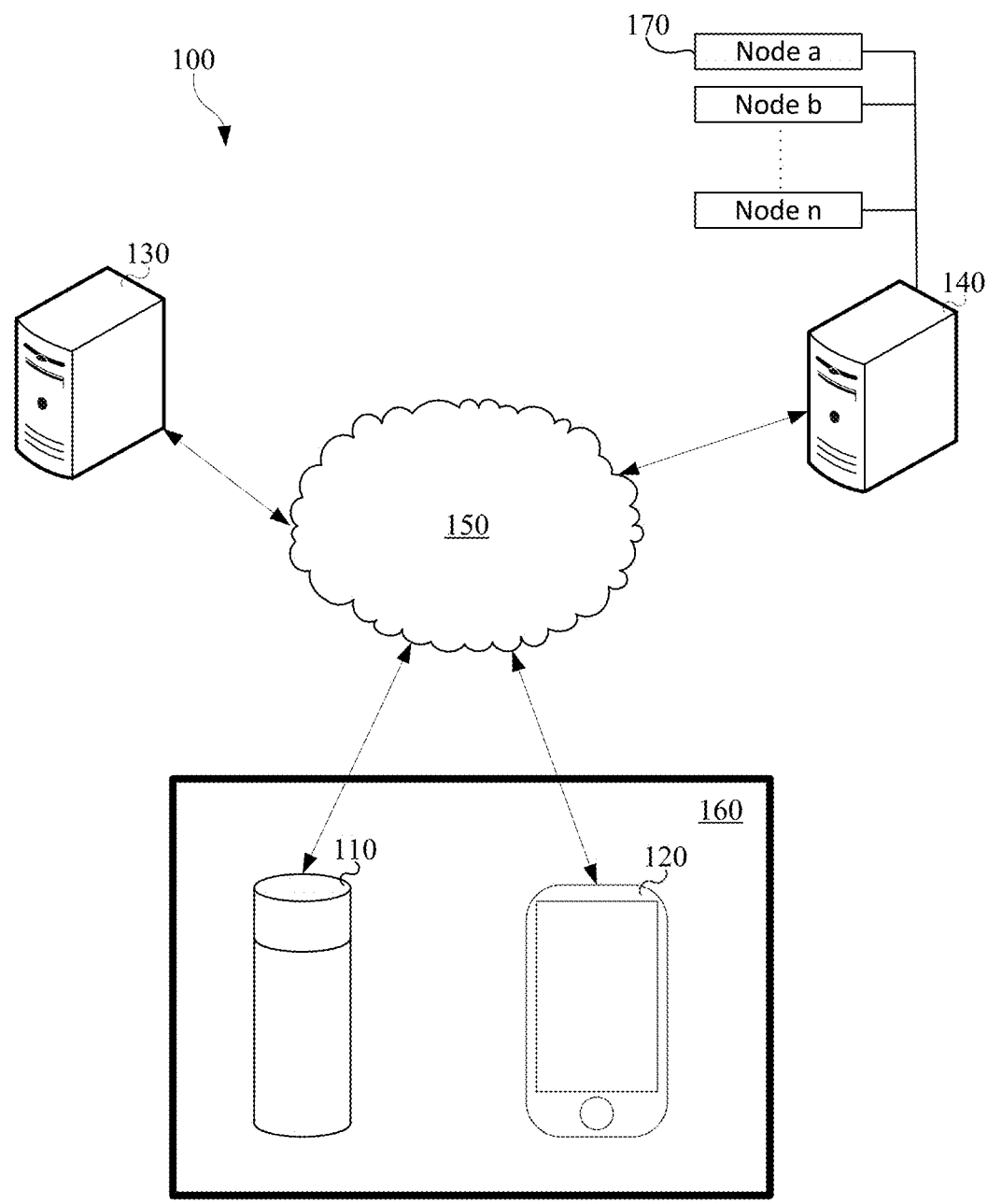
FIG. 1 is a schematic operation diagram illustrating an operating environment of an example embodiment.

In one aspect there may be provided a computer server system comprising a communications module; a processor coupled with the communications module; and a memory coupled to the processor and storing processor-executable instructions which, when executed by the processor, configure the processor to receive, via the communications module and from a first device, a signal including a request to schedule access to a shared resource within a time window; identify, based on a load projection for the shared resource, at least one time period within the time window for the access to the shared resource; send, via the communications module and to the first device, a signal including the at least one time period and requesting confirmation that a particular one of the at least one time period is acceptable; receive, via the communications module and from the first device, a signal including confirmation that the particular one of the at least one time period is acceptable; determine that a current time has reached the particular one of the at least one time period; and responsive to determining that the current time has reached the particular one of the at least one time period, provide access to a node of the shared resource, the node having available bandwidth.

In one or more embodiments, the processor-executable instructions, when executed by the processor, further configure the processor to obtain historical load data of the shared resource; and analyze the historical load data to generate the load projection of the shared resource.

In one or more embodiments, the processor-executable instructions, when executed by the processor, further configure the processor to engage an artificial intelligence component to generate the load projection of the shared resource, the artificial intelligence component trained to generate the load projection of the shared resource based at least on historical load data.

In one or more embodiments, the processor-executable instructions, when executed by the processor, further configure the processor to receive, via the communications module and from the first device, authentication information; and identify, based on the authentication information, one or more accounts associated with a requesting party.

In one or more embodiments, the processor-executable instructions, when executed by the processor, further configure the processor to send, via the communications module and to the first device, a signal causing the first device to output a message requesting information related to the request; receive, via the communications module and from the first device, a signal including information related to the request; and select the node based at least on the information related to the request.

In one or more embodiments, the processor-executable instructions, when executed by the processor, further configure the processor to responsive to receiving confirmation that the particular one of the at least one time period is acceptable, update the load projection to include the scheduled access to the shared resource.

In one or more embodiments, the first device includes a smart speaker device associated with another computer server system, the signals received from the first device are received via the other computer server system and the signals sent to the first device are sent via the other computer server system.

In one or more embodiments, the access to the node of the shared resource is provided to a second device different than the first device.

In one or more embodiments, when providing access to the node of the shared resource, the processor-executable instructions, when executed by the processor, further configure the processor to send, via the communications module and to the second device, a signal that, when answered, connects the second device to the node of the shared resource.

In one or more embodiments, the processor-executable instructions, when executed by the processor, further configure the processor to responsive to the second device not answering the signal after a period of time terminate the signal; identify, based on the load projection for the shared resource, at least one other time period for the access to the shared resource; and send, via the communications module and to at least one of the first device or the second device, a signal including an indication that the signal was missed and including the at least one other time period, the signal requesting confirmation that a particular one of the at least one other time period is acceptable.

In one or more embodiments, the shared resource is associated with a call center and the node of the shared resource is associated with a call agent of the call center.

In another aspect there may be provided a computer-implemented method comprising receiving, via a communications module and from a first device, a signal including a request to schedule access to a shared resource within a time window; identifying, based on a load projection for the shared resource, at least one time period within the time window for the access to the shared resource; sending, via the communications module and to the first device, a signal including the at least one time period and requesting confirmation that a particular one of the at least one time period is acceptable; receiving, via the communications module and from the first device, a signal including confirmation that the particular one of the at least one time period is acceptable; determining that a current time has reached the particular one of the at least one time period; and responsive to determining that the current time has reached the particular one of the at least one time period, providing access to a node of the shared resource, the node having available bandwidth.

In one or more embodiments, the method further comprises obtaining historical load data of the shared resource; and analyzing the historical load data to generate the load projection of the shared resource.

In one or more embodiments, the method further comprises engaging an artificial intelligence component to generate the load projection of the shared resource, the artificial intelligence component trained to generate the load projection of the shared resource based at least on historical load data.

In one or more embodiments, the method further comprises receiving, via the communications module and from the first device, authentication information; and identifying, based on the authentication information, one or more accounts associated with a requesting party.

In one or more embodiments, the method further comprises sending, via the communications module and to the first device, a signal causing the first device to output a message requesting information related to the request; receiving, via the communications module and from the first device, a signal including information related to the request; and selecting the available node based at least on the information related to the request.

In one or more embodiments, the method further comprises responsive to receiving confirmation that the particular one of the at least one time period is acceptable, updating the load projection to include the scheduled access to the shared resource.

In one or more embodiments, the first device includes a smart speaker device associated with another computer server system, the signals received from the first device via the other computer server system and the signals sent to the first device via the other computer server system.

In one or more embodiments, the access to the available node of the shared resource is provided to a second device different than the first device.

According to another aspect there may be provided a non-transitory computer readable storage medium comprising computer-executable instructions which, when executed, configure a processor to receive, via a communications module and from a first device, a signal including a request to schedule access to a shared resource within a time window; identify, based on a load projection for the shared resource, at least one time period within the time window for the access to the shared resource; send, via the communications module and to the first device, a signal including the at least one time period and requesting confirmation that a particular one of the at least one time period is acceptable; receive, via the communications module and from the first device, a signal including confirmation that the particular one of the at least one time period is acceptable; determine that a current time has reached the particular one of the at least one time period; and responsive to determining that the current time has reached the particular one of the at least one time period, provide access to a node of the shared resource, the node having available bandwidth.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a block diagram illustrating an operating environment of an example embodiment. Various components cooperate to provide a system 100 which may be used, for example, to provide access to a node of a shared resource. As shown, the system 100 includes an electronic device 110, a device 120, a first server computer system 130 and a second server computer system 140 coupled to one another through a network 150.

In this embodiment, the electronic device 110 and the device 120 are disposed in an environment 160. Put another way, the electronic device 110 and the device 120 are physically proximate.

The electronic device 110 is configured to communicate with the first server computer system 130 via the network 150 and vice-versa. The first server computer system 130 may be remote from the environment 160.

The device 120 is configured to communicate with the second server computer system 140 via the network 150 and vice-versa. The second server computer system 140 may be remote from the environment 160.

The first server computer system 130 is configured to communicate with the second server computer system 140 via the network 150 and vice-versa. The first server computer system 130 may be remote from the second server computer system 140.

The electronic device 110 is a computer system. In this embodiment, the electronic device 110 is a smart speaker. For example, the electronic device 110 may be a Google Home speaker or an Amazon Echo. The electronic device 110 may include one or more microphones for capturing acoustic signals (sounds) from the environment proximate the electronic device 110 (i.e. the environment 160) and one or more speakers for providing acoustic signals to the environment proximate the electronic device 110. Additionally or alternatively, the electronic device 110 may include one or more other components such as, for example, a hardware processor. The electronic device 110 may be adapted to provide a voice assistant. A user may interact with the electronic device 110 by providing voice utterances and the electronic device 110 may provide acoustic signals responsive to the voice utterances. In this way, the electronic device 110 may be used to request access to a node of a shared resource.

The device 120 may be, for example, a smartphone as shown. The device 120 may, however, be a computing device of another type such as for example a personal computer, a laptop computer, a tablet computer, a notebook computer, a hand-held computer, a personal digital assistant, a portable navigation device, a mobile phone, a smart phone, a wearable computing device (e.g. a smart watch, a wearable activity monitor, wearable smart jewelry, a glasses and other optical devices that include optical head-mounted displays), and any other type of computing device that may be configured to store data and software instructions, and execute software instructions to perform operations consistent with disclosed embodiments. The device 120 may, however, be a telephone device such as a landline telephone. In certain embodiments, the device 120 may be adapted to access a node of a shared resource.

The first server computing system 130 may have a trust relationship with the electronic device 110. Specifically, the electronic device 110 may trust the first server computer system 130 and/or the first server computer system 130 may trust the electronic device 110. For example, it may be that an account links the electronic device 110 and first server computer system 130 and that the first server computer system 130 trusts the electronic device 110 because it has authenticated with the first server computer system 130 relative to the account. The account may be, for example, a Google account where the electronic device 110 is a Google Home speaker. In another example, the account may be an Amazon account where the electronic device 110 is an Amazon Echo. The first server computer system 130 may service the electronic device 110 such as, for example, by providing a natural language processing service utilized by a voice assistant provided by the electronic device 110. In providing such a service and/or other services, the first server computer system 130 may perform one or more functions responsive to input received from the electronic device 110. Such functions may, as further described below, include determining one or more intents associated with input (e.g. utterances) received from the electronic device 110 via the network 150. Additionally or alternatively, such functions may, as further described below, include communicating with the second server computer system 140.

The first server computer system 130 may include a plug-in module configured to enable one or more plug-ins capable of processing various tasks and/or operations responsive to input received from the electronic device 110. The plug-in module may correspond to first party applications and/or third-party applications operable to perform different tasks or actions. For example, based on the context of audio received from the electronic device 110, the first server computer system 130 may use a certain application to retrieve or generate a response, which in turn may be communicated back to the electronic device 110.

The second server computer system 140 may be a shared resource server and may communicate with nodes 170 via a network. The network may include network 150 or may, for example, include a private network. As will be described in more detail below, the second server computer system 140 is configured to provide access to the nodes 170 of the shared resource. For example, the second server computer system 140 may be a call center server associated with a financial institution and each node 170 may be a device such as a telephone device, computing device, or other device associated with a call center agent. As another example, the second server computer system 140 may be configured to schedule electric vehicle charging and as such each node 170 may be an electric vehicle charging station.

The first server computer system 130 and the second server computer system 140 are computer systems. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The network 150 is a computer network. The network 150 may include a public network such as the Internet and/or a private network. In some embodiments, the network 150 may be an internetwork such as may be formed of one or more interconnected computer networks. For example, the network 150 may be or may include an Ethernet network, a wireless network, a telecommunications network, or the like.

FIG. 1 illustrates an example representation of components of the system 100. The system 100 can, however, be implemented differently than the example of FIG. 1. For example, various components that are illustrated as separate systems in FIG. 1 may be implemented on a common system. By way of further example, the functions of a single component may be divided into multiple components.

As mentioned, the second server computer system 140 may be a call center server associated with a financial institution. In one or more embodiments, the second server computer system 140 may additionally maintain customer bank accounts. That is, the second server computer system 140 may maintain a database that includes various data records. A data record may, for example, reflect an amount of value stored in a particular account associated with a user.

Each account maintained by the second server computer system 140 may be associated with authentication information. The authentication information may be or may include any one or more of a token, a username, a password, a personal identification number (PIN), biometric data, etc. The authentication information may be used by the second server computer system 140 to authenticate a device such as for example the electronic device 110 and/or the device 120. More specifically, the authentication information may be used to determine that the electronic device 110 and/or device 120 is/are being operated by an authorized user and to identify one or more accounts. In this manner, the call center agents may operate nodes 170 to access data records maintained by the second server computer system 140.

Figure 2:
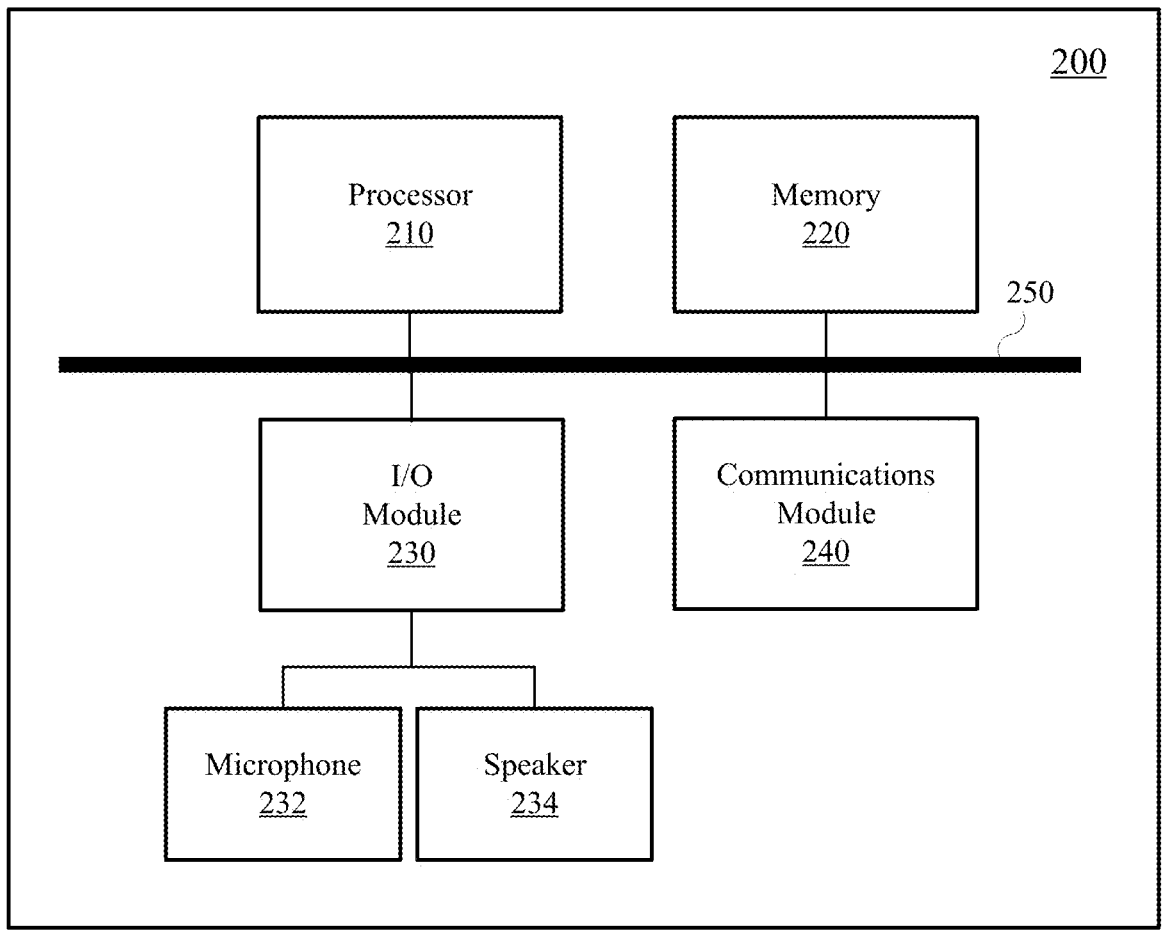
FIG. 2 is a high-level schematic diagram showing components of an example electronic device.

FIG. 2 is a simplified schematic diagram showing components of an electronic device 200. The electronic device 110 may be of the same type as the electronic device 200. The electronic device 200 includes a variety of modules. For example, as illustrated, the electronic device 200 may include a processor 210, a memory 220, an input/output module 230 and/or a communications module 240 in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the electronic device 200.

The I/O module 230 is an input module and an output module. As an input module, the I/O module 230 allows the electronic device 200 to receive input from components of the electronic device 200. As an output module, the I/O module 230 allows the electronic device 200 to provide output to components of the electronic device 200. For example, the I/O module 230 may, as illustrated, be in communication with a microphone 232 and a speaker 234. The microphone 232 may include one or more microphones which may, for example, form a microphone array. The microphone 232 may be employed for capturing acoustic signals from the environment proximate the electronic device 200. The speaker 234 may include one or more speakers for providing acoustic signals to the environment proximate the electronic device 200. In summary, the I/O module 230 may allow the electronic device 200 to receive input via a microphone 232 and provide output via a speaker 234.

The communications module 240 allows the electronic device 200 to communicate with other computing devices and/or various communications networks such as, for example, the network 150. The communications module 240 may allow the electronic device 200 to send or receive communications signals. Communications signals may be sent or received according to one or more protocols or according to one or more standards. For example, the communications module 240 may allow the electronic device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 240 may allow the electronic device 200 to communicate via Wi-Fi™, using Bluetooth™ or via some combination of one or more networks or protocols. In some embodiments, all or a portion of the communications module 240 may be integrated into a component of the electronic device 200. For example, the communications module 240 may be integrated into a communications chipset.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220. Such software may, for example, adapt the electronic device 200 to serve as a smart speaker such as, for example, to provide voice assistant services.

Figure 3:
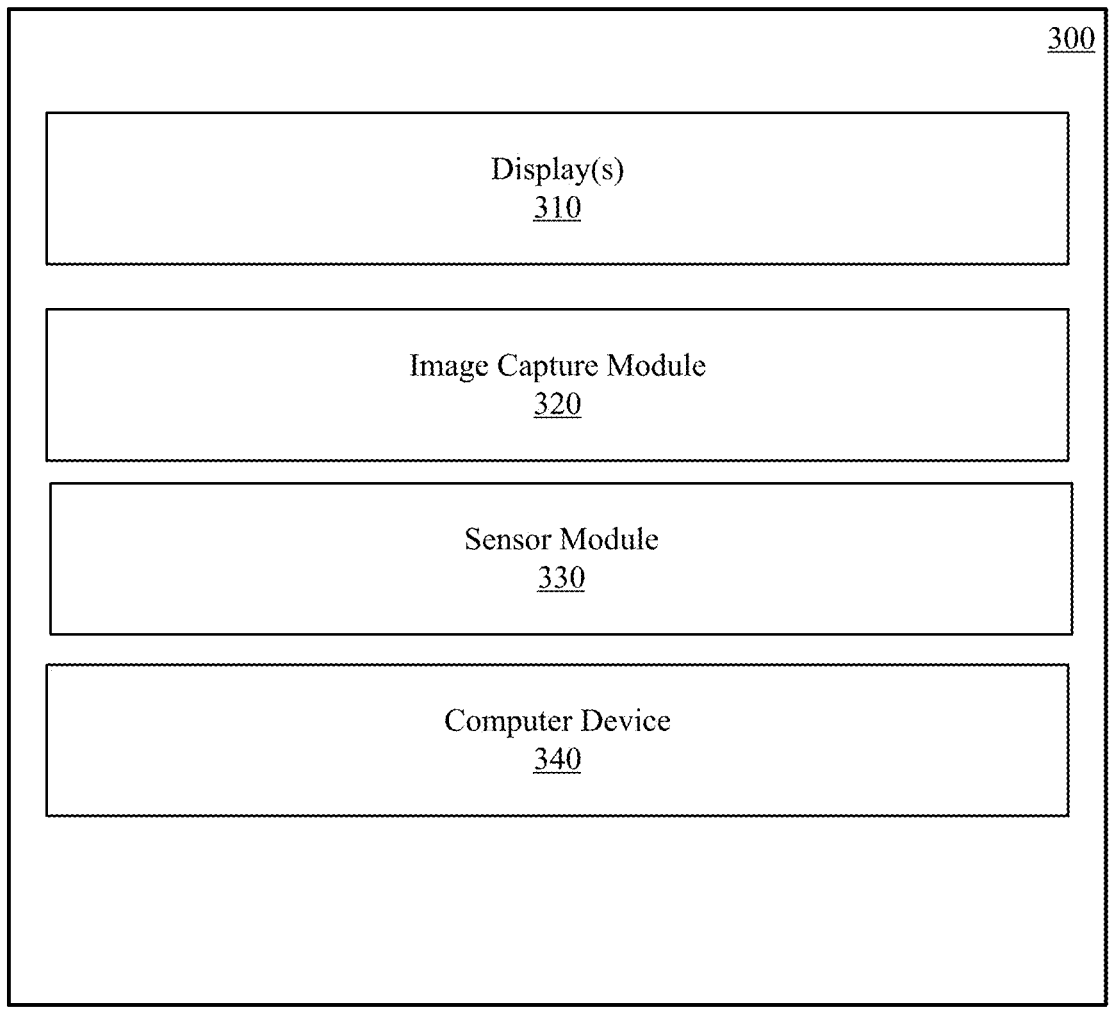
FIG. 3 is a simplified schematic diagram showing components of a computing device.

FIG. 3 is a simplified schematic diagram showing components of an exemplary computing device 300. In some embodiments, the device 120 may be a computing device of the same type as computing device 300. The computing device 300 may include modules including, as illustrated, for example, one or more displays 310, an image capture module 320, a sensor module 330, and a computer device 340.

The one or more displays 310 are a display module. The one or more displays 310 are used to display screens of a graphical user interface that may be used, for example, to communicate with the second server computer system 140 (FIG. 1). The one or more displays 310 may be internal displays of the computing device 300 (e.g., disposed within a body of the computing device).

The image capture module 320 may be or may include a camera. The image capture module 320 may be used to obtain image data, such as images. The image capture module 320 may be or may include a digital image sensor system as, for example, a charge coupled device (CCD) or a complementary metal-oxide-semiconductor (CMOS) image sensor.

The sensor module 330 may be a sensor that generates sensor data based on a sensed condition. By way of example, the sensor module 330 may be or include a location subsystem which generates location data indicating a location of the computing device 300. The location may be the current geographic location of the computing device 300. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 340 is in communication with the one or more displays 310, the image capture module 320, and the sensor module 330. The computer device 340 may be or may include a processor which is coupled to the one or more displays 310, the image capture module 320, and/or the sensor module 330.

Figure 4:
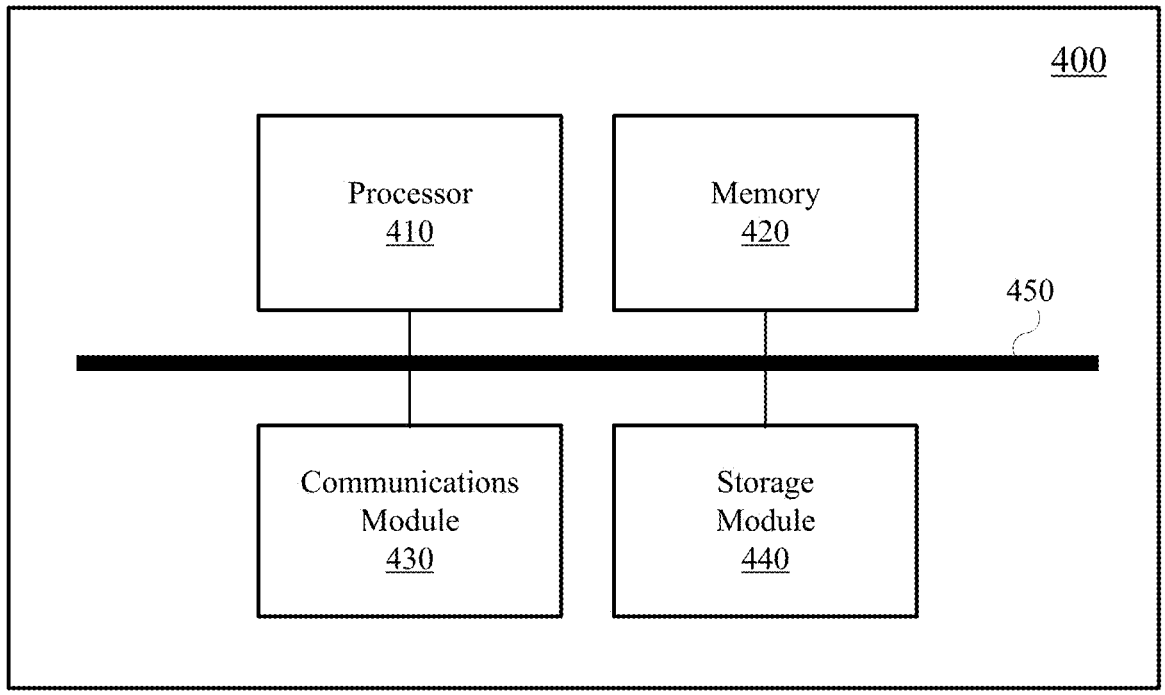
FIG. 4 is a high-level schematic diagram of an example computer device.

Referring now to FIG. 4, a high-level operation diagram of an example computer device 400 is shown. In some embodiments, the computer device 400 may be exemplary of the computer device 340 (FIG. 3), the first server computer system 130 and/or the second server computer system 140.

The example computer device 400 includes a variety of modules. For example, as illustrated, the example computer device 400 may include a processor 410, a memory 420, a communications module 430, and/or a storage module 440. As illustrated, the foregoing example modules of the example computer device 400 are in communication over a bus 450.

The processor 410 is a hardware processor. The processor 410 may, for example, be one or more ARM, Intel x86, PowerPC processors or the like.

The memory 420 allows data to be stored and retrieved. The memory 420 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 400.

The communications module 430 allows the example computer device 400 to communicate with other computer or computing devices and/or various communications networks. For example, the communications module 430 may allow the example computer device 400 to send or receive communications signals. Communications signals may be sent or received according to one or more protocols or according to one or more standards. For example, the communications module 430 may allow the example computer device 400 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 430 may allow the example computer device 400 to communicate using near-field communication (NFC), via Wi-Fi™, using Bluetooth™ or via some combination of one or more networks or protocols. In some embodiments, all or a portion of the communications module 430 may be integrated into a component of the example computer device 400. For example, the communications module may be integrated into a communications chipset.

The storage module 440 allows the example computer device 400 to store and retrieve data. In some embodiments, the storage module 440 may be formed as a part of the memory 420 and/or may be used to access all or a portion of the memory 420. Additionally or alternatively, the storage module 440 may be used to store and retrieve data from persisted storage other than the persisted storage (if any) accessible via the memory 420. In some embodiments, the storage module 440 may be used to store and retrieve data in a database. A database may be stored in persisted storage. Additionally or alternatively, the storage module 440 may access data stored remotely such as, for example, as may be accessed using a local area network (LAN), wide area network (WAN), personal area network (PAN), and/or a storage area network (SAN). In some embodiments, the storage module 440 may access data stored remotely using the communications module 430. In some embodiments, the storage module 440 may be omitted and its function may be performed by the memory 420 and/or by the processor 410 in concert with the communications module 430 such as, for example, if data is stored remotely. The storage module may also be referred to as a data store.

Software comprising instructions is executed by the processor 410 from a computer-readable medium. For example, software may be loaded into random-access memory from persistent storage of the memory 420. Additionally or alternatively, instructions may be executed by the processor 410 directly from read-only memory of the memory 420.

Figure 5:
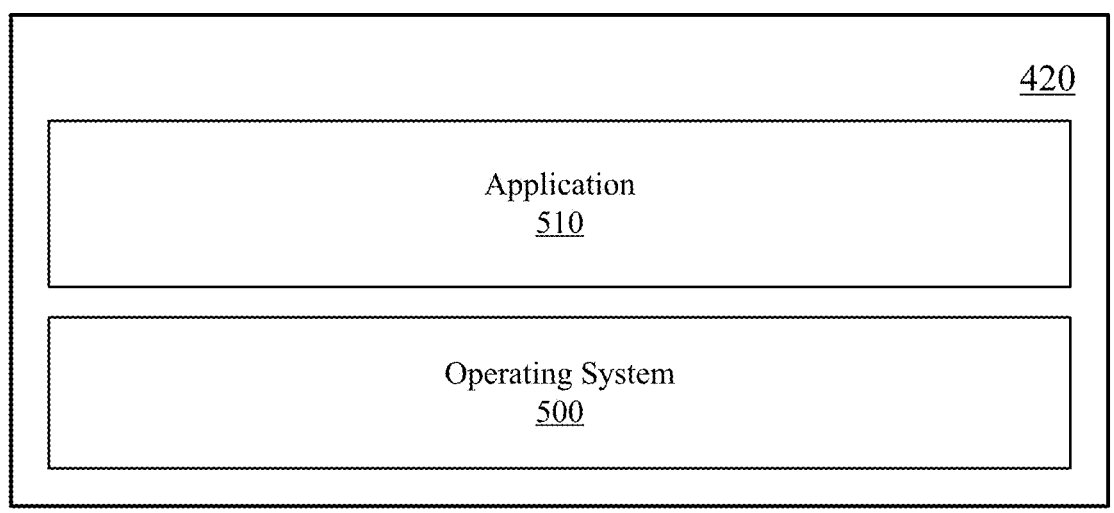
FIG. 5 shows a simplified organization of software components stored in a memory of the example computer device of FIG. 4.

FIG. 5 depicts a simplified organization of software components stored in the memory 420 of the example computer device 400 (FIG. 4). As illustrated, these software components include an operating system 500 and an application 510.

The operating system 500 is software. The operating system 500 allows the application 510 to access the processor 410, the memory 420, and the communications module 430 of the example computer device 400 (FIG. 4). The operating system 500 may be, for example, Google™ Android™, Apple™ iOS™, UNIX™, Linux™, Microsoft™ Windows™, Apple OSX™ or the like.

The application 510 adapts the example computer device 400, in combination with the operating system 500, to operate as a device performing a particular function. For example, the application 510 may cooperate with the operating system 500 to adapt a suitable embodiment of the example computer device 400 to operate as the computer device 340 (FIG. 2), the first server computer system 130 and/or the second server computer system 140.

While a single application 510 is illustrated in FIG. 5, in operation the memory 420 may include more than one application 510 and different applications 510 may perform different operations. For example, in at least some embodiments in which the computer device 400 is functioning as the device 120, the applications 510 may include a banking application. The banking application may be configured for secure communications with the second server computer system 140 and may provide various banking functions such as, for example, the ability to display a quantum of value in one or more data records (e.g. display balances), configure or request that operations such as transfers of value (e.g. bill payments, email money transfers and other transfers) be performed, and other account management functions. For example, the banking application may be configured to request access to a node of a shared resource.

By way of further example, in at least some embodiments in which the computer device 400 functions as the device 120, the applications 510 may include a web browser, which may also be referred to as an Internet browser. In at least some such embodiments, the second server computer system 140 may be a web server. The web server may cooperate with the web browser and may serve as an interface when the interface is requested through the web browser. For example, the web browser may serve as a mobile banking interface. The mobile banking interface may provide various banking functions such as, for example, the ability to display a quantum of value in one or more data records (e.g. display balances), configure or request that operations such as transfers of value (e.g. bill payments and other transfers) be performed, and other account management functions. For example, the mobile application interface may be configured to request access to a node of a shared resource.

By way of further example, in at least some embodiments in which the computer device 400 functions as the device 120, the applications 510 may include an electronic messaging application. The electronic messaging application may be configured to display a received electronic message such as an email message, short messaging service (SMS) message, or a message of another type. In at least some embodiments, the second server computer system 140 may be configured, through computer-executable instructions, to send an electronic message to the device 120. For example, the second server computer system 140 may be configured to send a SMS message to a phone number associated with a user and an electronic messaging application on the device 120 may be configured to retrieve the message and display the message to the user. As another example, the second server computer system 140 may be configured to send an email message to an email address associated with a user and an email application on the device 120 may be configured to retrieve the message and display the message to the user.

As mentioned, the first server computer system 130 may include a plug-in module configured to enable one or more plug-ins capable of processing various tasks and/or operations responsive to input received from the electronic device 110. The plug-in module may correspond to first party applications and/or third-party applications operable to perform different tasks or actions. The plug-in modules may include, for example, Alexa Skills and/or Google Assistant Actions. Based on the context of audio received from the electronic device 110, the first server computer system 130 may use a certain plug-in module to retrieve or generate a response, which in turn may be communicated back to the electronic device 110.

In one or more embodiments, the plug-in module may allow the first server computer system 130 to communicate with the second server computer system 140. For example, the plug-in module may be configured to generate a request to access a node of a shared resource based on input received by the electronic device 110 and send the request to the second server computer system 140. As another example, the plug-in module may correspond to a third-party application such as for example a banking application. The banking application corresponding to the plug-in module may be similar to the banking application resident on the device 120.

To enable a plug-in module on the electronic device 110, a user may be in the environment 160 and may submit input in the form of a voice utterance requesting that the plug-in be enabled. For example, where the electronic device 110 is an Amazon Echo, the user may say "Hey Alexa, enable The Banking Application." The electronic device 110 may communicate the voice utterance as voice data to the first server computer system 130. The first server computer system 130 may analyze the voice data and convert the voice data to text using, for example, natural language processing. The text is then parsed and processed to determine an intent (e.g. command) matching the voice utterance contained in the voice data and one or more parameters for the intent. Based on the intent and one or more parameters for the intent, the first server computer system 130 may identify the requested plug-in module and may accordingly enable the plug-in module. The user may alternatively enable the banking application by logging into their account associated with the electronic device 110 and this may be done using, for example, the device 120.

As mentioned, in embodiments where the second server computer system 140 is associated with a financial institution, each account maintained by the second server computer system 140 may be associated with authentication information. The authentication information may be or may include any one or more of a token, a username, a password, a personal identification number (PIN), biometric data, etc. Responsive to the user enabling the plug-in module on the electronic device 110, the user may be prompted to enter authentication information to link the electronic device 110 to their account. For example, the second server computer system 140 may send a signal to the first server computer system 130 requesting authentication information. The first server computer system 130 may send a signal to the electronic device 110 causing the electronic device 110 to output a command requesting that the user authenticate the electronic device 110. The user may use the banking application or web browser executing on the device 120 to enter authentication information to link the electronic device 110 to their account. The user may also select one or more permissions to be granted to the electronic device 110. For example the user may provide read-only access to the electronic device 110. As another example, the user may permit the electronic device 110 to accept a transfer of funds into the account but may not permit the electronic device 110 to transfer funds out of the account. The user may also be prompted to (optionally) create a password such as a four-digit PIN that may be used by the electronic device 110 to authenticate the electronic device 110.

Figure 6:
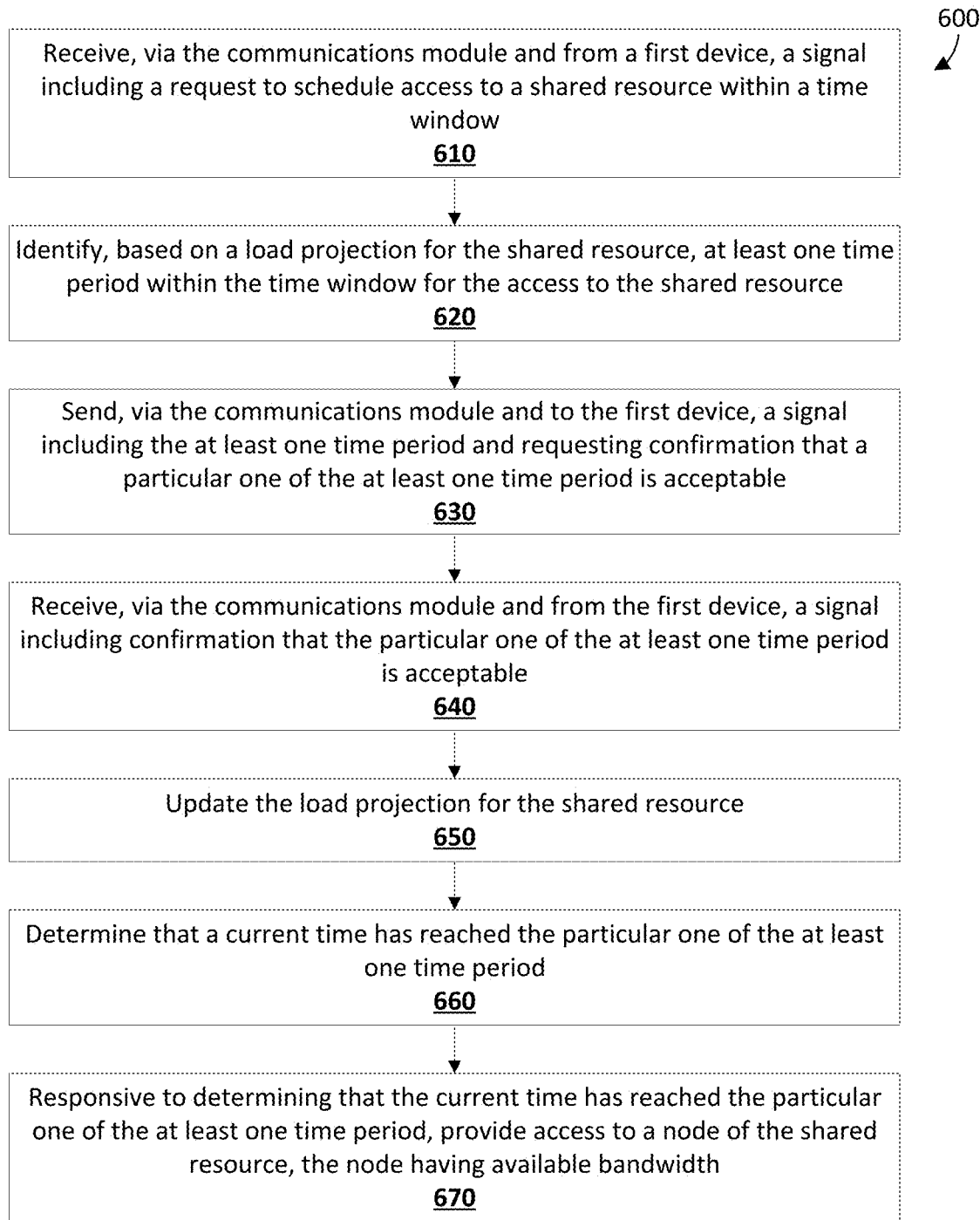
FIG. 6 is a flowchart showing operations performed by a server in providing access to a node of a shared resource according to an embodiment.

As mentioned, the second server computer system 140 provides access to a node of a shared resource. FIG. 6 is a flowchart showing operations performed by the second server computer system 140 in providing access to a node of a shared resource according to an embodiment. The operations may be included in a method 600 which may be performed by the second server computer system 140. For example, computer-executable instructions stored in memory of the second server computer system 140 may, when executed by one or more processors, configure the second server computer system 140 to perform the method 600 or a portion thereof.

The second server computer system 140 receives, via the communications module and from a first device, a signal including a request to schedule access to a shared resource within a time window (step 610). In this embodiment, the first device may be the electronic device 110 and as such the signal including the request to schedule access to the shared resource within the time window may be received from the first device via the first server computer system 130.

A user may be in the environment 160 and may submit input in the form of a voice utterance requesting to schedule access to the shared resource. For example, where the shared resource includes nodes associated with the second server computer system 140 and where the electronic device 110 is an Amazon Echo, the user may say "Hey Alexa, ask my bank to call me tomorrow."

The electronic device 110 may communicate the voice utterance as voice data to the first server computer system 130. The first server computer system 130 may analyze the voice data and convert the voice data to text using, for example, natural language processing. The text is then parsed and processed to determine an intent (e.g. command) matching the voice utterance contained in the voice data and one or more parameters for the intent. Based on the intent ("bank") and one or more parameters for the intent ("call me tomorrow"), the first server computer system 130 may identify a plug-in module required to fulfil the request. For example, the first server computer system 130 may identify "The Banking Application" plug-in as being the plug-in module required to complete the request and as such the first server computer system 130 may send a signal including the request to the second server computer system 140. The signal may include data identifying the request and data identifying the device where the request was initiated, which in this embodiment is the electronic device 110.

In this embodiment, the intent and/or parameters may be used to identify the time window. For example, where the user has said "ask my bank to call me tomorrow" the parameter "tomorrow" may be the identified time window. It will be appreciated that the time period may include a particular day or time of the day for the requested access. For example, the time period may include "tomorrow afternoon" or may be "tomorrow around 3 pm."

In embodiments where the user must authenticate at the electronic device 110, responsive to receiving the request to complete the one or more operations, the second server computer system 140 may send a signal to the first server computer system 130 requesting authentication information. In turn, the first server computer system 130 may send a signal to the electronic device 110, the signal causing the electronic device 110 to output a message requesting the authentication information. For example, the electronic device 110 may say "Please say your four-digit PIN associated with your account."

The user may submit input in the form of a voice utterance to provide their four-digit PIN. The voice utterance may be processed in manners similar to that described herein. The four-digit PIN is provided by the first server computer system 130 to the second server computer system 140 to authenticate the electronic device 110. In the event that the electronic device 110 cannot be authenticated, for example if the four-digit PIN is incorrect, the second server computer system 140 may send a signal causing the electronic device 110 to output a message indicating that authentication has failed.

The second server computer system 140 may identify an account associated with the request based on, for example, information identifying the electronic device 110 and/or the authentication information. For example, upon successful authentication, the second server computer system 140 may identify the account and may retrieve, for example, contact information of a user associated with the account from the database. The contact information may include, for example, a phone number associated with the account.

It will be appreciated that in embodiments where the time window cannot be identified, the second server computer system 140 may send a signal to the first server computer system 130 requesting the time window. In response, the first server computer system 130 may send a signal to the electronic device 110, the signal causing the electronic device 110 to output a message such as "When would you like your bank to call you?" The user may then provide input in the form of a voice utterance and the input may be processed in manners similar to that described herein. Accordingly, the time window may be provided to the second server computer system 140.

The second server computer system 140 identifies, based on a load projection for the shared resource, at least one time period within the time window for the access to the shared resource (step 620).

The load projection may be based on, for example, historical load data. The historical load data may identify a number of total nodes, a number of nodes that did not have available bandwidth and a number of nodes that did have available bandwidth. The historical load data may additionally include a time duration for when bandwidth of a particular node was being consumed and/or was available.

In this example, the second server computer system 140 may obtain the historical load data from memory and may analyze the historical load data to identify the at least one time period. For example, the second server computer system 140 may determine an average load for a particular time period based on the historical load data. The average load may be determined for a particular day (Monday) on a particular month (February). The average load may include weekends and/or holidays. For example, the average load may be determined for Thanksgiving Day based on historical load data from previous Thanksgiving Days.

The historical load data may be updated, for example, at the end of each day. For example, at the end of a day, the load data for the day may be stored in memory and thus included as historical load data.

The second server computer system 140 may engage an artificial intelligence component to generate the load projection of the shared resource. In this embodiment, the artificial intelligence component may be trained to generate the load projection of the shared resource based at least on historical load data. For example, at the end of a day, the load data for the day may be included as historical load data and the artificial intelligence component may analyze the (updated) historical load data to generate an updated load projection.

Figure 7:
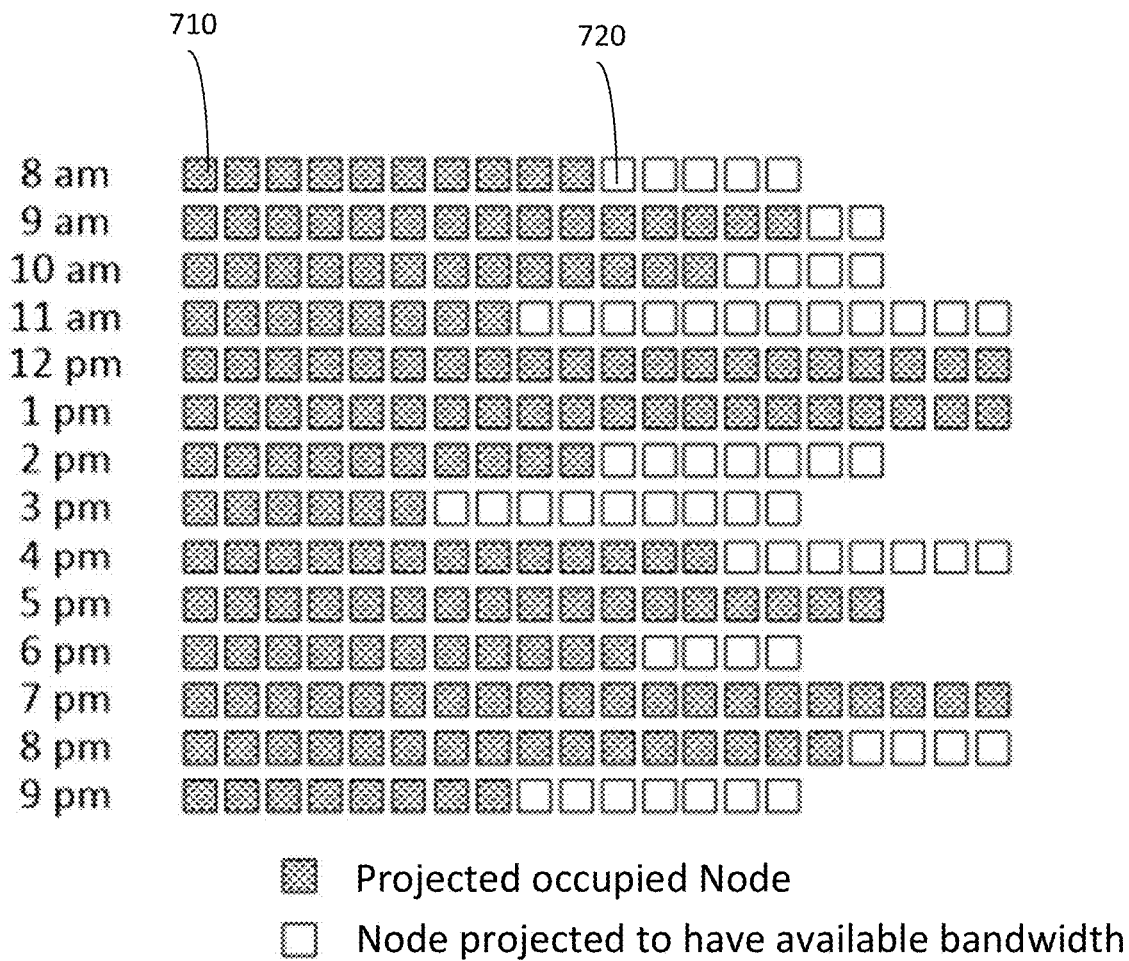
FIG. 7 is a chart showing an example load projection.

An example load projection is shown in FIG. 7. The load projection may be generated by, for example, the artificial intelligence component. As can be seen, the load projection includes projected occupied nodes 710 and nodes projected to have available bandwidth 720. An occupied node may be a node that is not projected to have available bandwidth. The total number of nodes may vary for each hour and this may be based on a predetermined schedule. For example, at 8 am, fifteen (15) nodes are scheduled, where ten (10) nodes are projected to be occupied and five (5) nodes are projected to have available bandwidth.

The at least one time period is identified as a time period where at least one node has available bandwidth to fulfil the request. Put another way, the second server computer system 140 determines at least one time period where the load projection indicates that at least one node has available bandwidth to fulfil the request.

The at least one time period may include a single time period or may include multiple time periods. For example, the second server computer system 140 may identify all time periods within the time window that have at least one node with available bandwidth to fulfil the request.

The time period may indicate a start time for when access may be provided to a node of the shared resource. For example, the load projection may indicate that a node has available bandwidth between 9 am and 10 am on a particular day. As such, the at least one time period may be identified as "9 am". As another example, the at least one time period may be identified as "between 9 am and 10 am" and as such access may be provided to the node of the shared resource at a time between 9 am and 10 am.

In at least some embodiments where no time period can be identified, that is, where it is projected that no nodes will have available bandwidth within the time window, the second server computer system 140 may send, via the communications module and to the first device, a signal indicating that no time periods are available and requesting a different time window. The second server computer system 140 may then identify at least one time period based on the different time window.

The second server computer system 140 sends, via the communications module and to the first device, a signal including the at least one time period and requesting confirmation that a particular one of the at least one time period is acceptable (step 630).

In this embodiment, the first device may be the electronic device 110 and as such the signal including the at least one time period and requesting confirmation that a particular one of the at least one time period is acceptable may be sent to the first device via the first server computer system 130. Specifically, the signal is sent, via the communications module and to the first server computer system 130. The signal is processed by the first server computer system 130 and is sent to the electronic device 110, the signal causing the electronic device 110 to output a message including the at least one time period and requesting confirmation that a particular one of the at least one time period is acceptable. For example, the signal may cause the electronic device 110 to output a message saying "Your bank can call you at 10 am tomorrow. Does that work?" As another example, the signal may cause the electronic device 110 to output a message saying "Your bank can call you at 10 am or 11 am tomorrow, is there a time that works best for you?" As yet another example, the signal may cause the electronic device 110 to output a message saying "Your bank can call you between 9 am and 10 am tomorrow, does that work?"

The second server computer system 140 receives, via the communications module and from the first device, a signal including confirmation that the particular one of the at least one time period is acceptable (step 640).

In this embodiment, the first device may be the electronic device 110 and as such the signal including the confirmation that the particular one of the at least one time period is acceptable may be received from the first device via the first server computer system 130. Specifically, the user may provide input in the form of a voice utterance and the input may be processed in manners similar to that described herein. For example, in response to the message "Your bank can call you at 10 am tomorrow. Does that work?" output during step 630, the user may say "Yes" or "No". As another example, in response to the message "Your bank can call you at 10 am or 11 am tomorrow, is there a time that works best for you?" the user may say "10 am" or "11 am" or "No". As yet another example, in response to the message "Your bank can call you between 9 am and 10 am tomorrow, does that work?" the user may say "Yes" or "No".

Responsive to the user replying with "No", the method 600 may return to step 620 where the second server computer system 140 may determine at least one other time period or may request a different time window.

Responsive to the second server computer system 140 receiving the signal confirming that the particular one of the at least one time period is acceptable, the second server computer system 140 updates the load projection for the shared resource (step 650).

Specifically, the second server computer system 140 updates the load projection to indicate that a node will have no available bandwidth during the particular at least one time period. For example, where access to the resource is scheduled for 10 am, the second server computer system 140 may update the load projection to indicate that a node does not have available bandwidth at 10 am due to the second server computer system 140 providing access to the node based on the request. In this manner, the load projection data may be updated in real-time to indicate any changes to the load due to the second server computer system 140 fulfilling requests. The second server computer system 140 may, for example, engage the artificial intelligence component to update the load projection.

Figure 8:
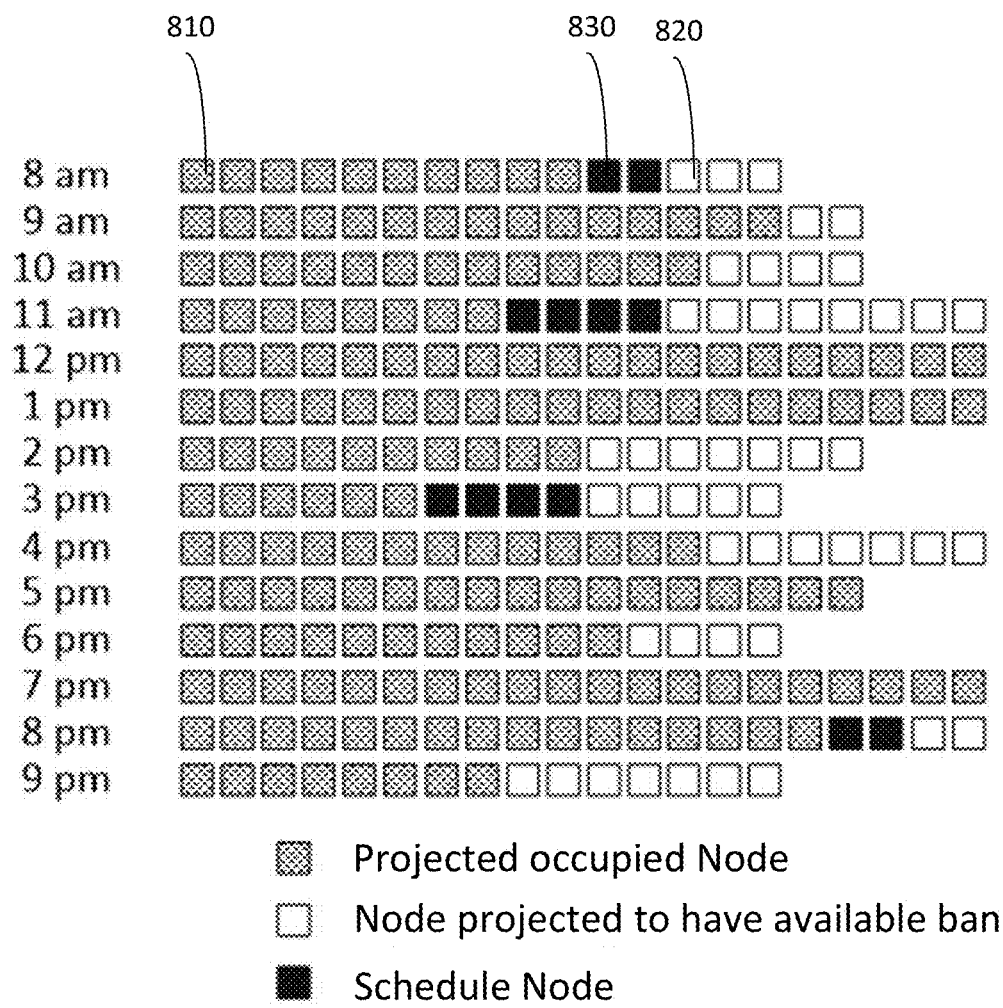
FIG. 8 is a chart showing an example updated load projection.

An example updated load projection is shown in FIG. 8. As mentioned, the updated load projection may be generated by, for example, the artificial intelligence component. As can be seen, the load projection includes projected occupied nodes 810, nodes projected to have available bandwidth 820 and scheduled nodes 830. The scheduled nodes include nodes that have been scheduled based on the second server computer system 140 receiving the signal confirming that the particular one of the at least one time period is acceptable.

The node may be a particular node that is reserved at the at least one time period. For example, where a node "A" and a node "B" have available bandwidth, the load projection may be updated to indicate that bandwidth of node "A" is reserved. In another embodiment, the node may not be a particular node. For example, two nodes may be available at the at least one time period and the load projection may be updated to indicate that the bandwidth of one of the available nodes is reserved. As such, the updated load projection may indicate that only one node is available at the at least one time period.

The second server computer system 140 determines that a current time has reached the particular one of the at least one time period (step 660). The second server computer system 140 determines that the current time has reached the particular one of the at least one time period. For example, where the particular at least one time period is 10 am, the second server computer system 140 determines that the current time is 10 am.

Responsive to determining that the current time has reached the particular one of the at least one time period, the second server computer system 140 provides access to a node of the shared resource, the node having available bandwidth (step 670). In this embodiment, the second server computer system 140 provides access to a node having available bandwidth. The access may include, for example, connecting the node to a device. The device may be the first device or may be a second device that is different than the first device.

As an example, the node may be a computing device and/or a telephone device and the second server computer system 140 may send a telephone signal to the device 120 that, when answered, initiates a telephone call. Responsive to the device 120 answering the telephone call, the second server computer system 140 may connect the node to the device 120. Put another way, during step 670, the second server computer system 140 may send, via the communications module and to the second device, a signal that, when answered, connects the second device to the node of the shared resource. When connected, the user may have a telephone call with, for example, a call center agent.

In manners described herein, existing capacity of the shared resource, specifically nodes that have available bandwidth that would otherwise be expected to idle, are used to provide access to the shared resource. Further, because the user could, potentially, otherwise be expected to make an attempt to access the shared resource, the provided access to the shared resource is directed to a time when a node has available bandwidth.

In embodiments where the shared resource is associated with a call center and the nodes are associated with call agents of the call center, user activity is, instead of potentially calling the call center during a busy time, directed to a time when the call center has an available agent and this may shift demand to less idle times.

Figure 9:
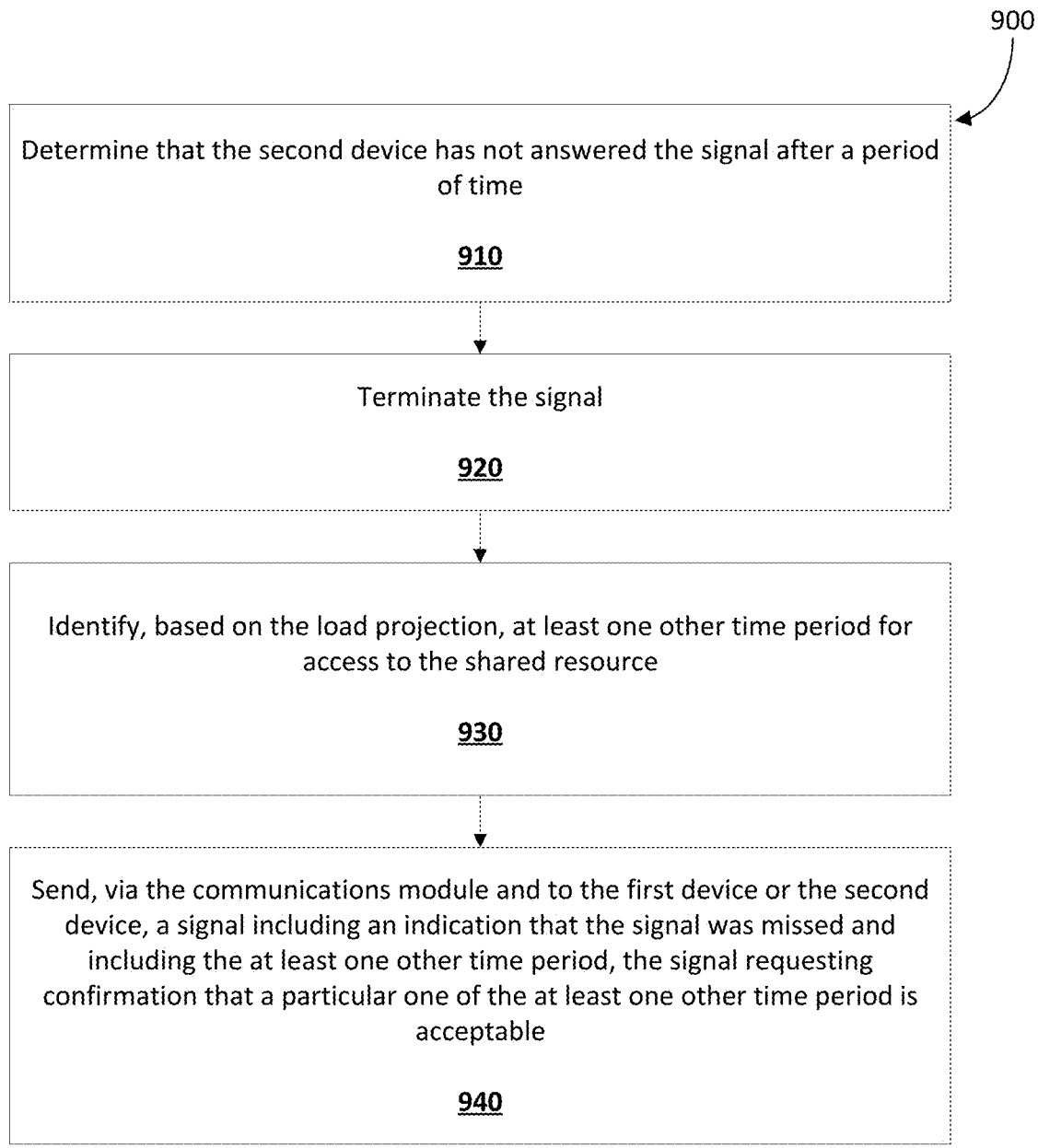
FIG. 9 is a flowchart showing operations performed by a server in sending a signal requesting confirmation that at least one other time period is acceptable according to an embodiment.

It will be appreciated that in embodiments where the signal is a telephone signal, the signal may not be answered by the second device. When the signal is not answered by the second device, the second server computer system 140 may perform a method 900. FIG. 9 is a flowchart showing operations performed by the second server computer system 140 according to an embodiment. The operations may be included in the method 900. For example, computer-executable instructions stored in memory of the second server computer system 140 may, when executed by one or more processors, configure the second server computer system 140 to perform the method 900 or a portion thereof.

The second server computer system 140 determines that the second device has not answered the signal after a period of time (step 910). In this embodiment, the second device may be the device 120 and the signal may be a telephone call signal. The period of time may be, for example, 30 seconds.

Responsive to the second device not answering the signal after a period of time, the second server computer system 140 may terminate the signal (step 920). The signal is terminated after the period of time and as such the second device does not receive the telephone call signal after the period of time.

The second server computer system 140 identifies, based on the load projection for the shared resource, at least one other time period for the access to the shared resource (step 930). In this embodiment, the at least one other time period may be within the time window or may be in a different time window. For example, where the time window was "tomorrow (Wednesday) morning" the second server computer system 140 may determine a different time window such as for example "Thursday morning." The at least one time period may be determined in manners similar to that described herein.

The second server computer system 140 may send, via the communications module and to the first device and/or the second device, a signal including an indication that the signal was missed. The signal may include the at least one other time period and may request confirmation that a particular one of the at least one other time period is acceptable (step 940). The signal may be sent to, for example, the electronic device 110 and this may cause the electronic device 110 to output a message saying "Your bank tried calling you. Are you available for a call tomorrow morning at 10 am?" The user may respond to the output message in manners similar to that described herein.

The signal may additionally or alternatively be sent to the device 120. For example, the second server computer system 140 may send a text or SMS message to a phone number associated with the user and the device 120 may retrieve the text or SMS message. The text or SMS message may include a request that the user reply to the message to confirm. The electronic device 110 may additionally retrieve the text or SMS message. As another example, the second server computer system 140 may send an email message to an email address associated with the user and the device 120 may retrieve the email message. The email message may include, for example, one or more selectable options that may be selected to confirm. The electronic device 110 may additionally retrieve the email message.

Figure 10:
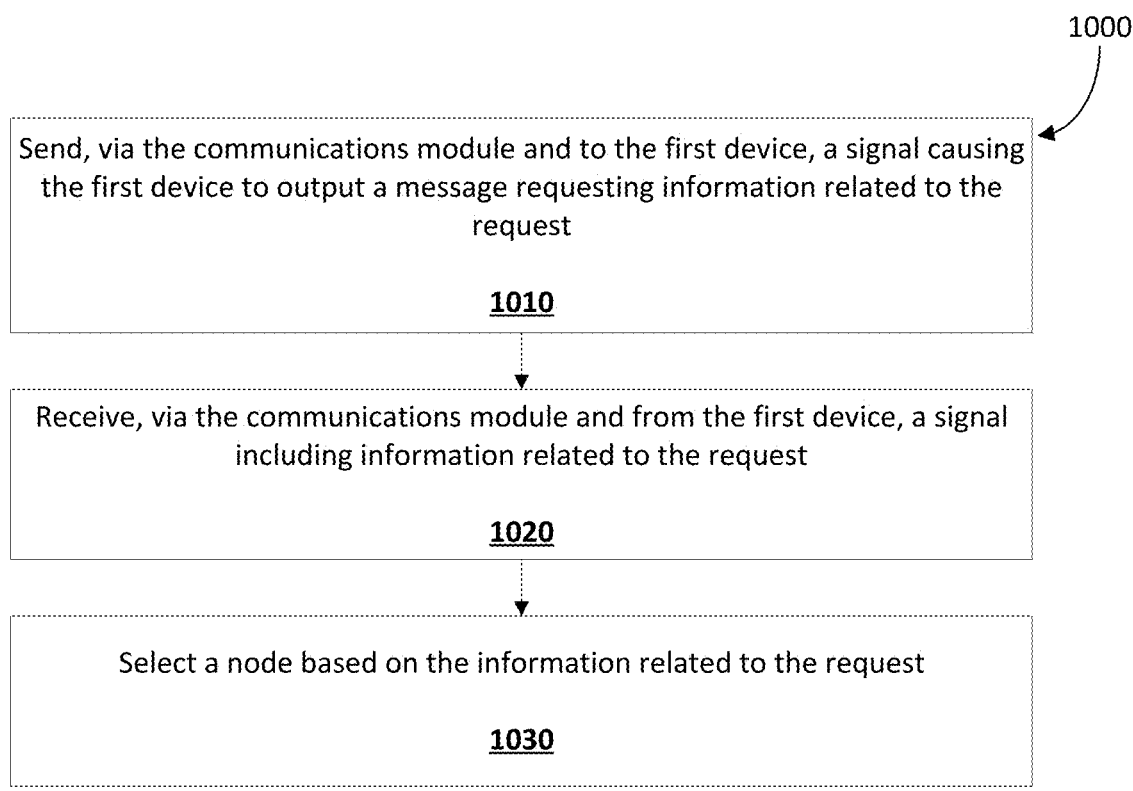
FIG. 10 is a flowchart showing operations performed by a sever in selecting a node based on information related to the request according to an embodiment.

In embodiments described herein, the second server computer system 140 is described as updating the load projection to indicate that a node will have no available bandwidth during the particular at least one time period, where the node may be a particular node. In embodiments, the second server computer system 140 may obtain additional information from the user to select the particular node. For example, during method 600, responsive to receiving the request to schedule access to the shared resource, the second server computer system 140 may obtain information related to the request this may be used to select a particular node. FIG. 10 is a flowchart showing operations performed by the second server computer system 140 in selecting a particular node according to an embodiment. The operations may be included in the method 1000. For example, computer-executable instructions stored in memory of the second server computer system 140 may, when executed by one or more processors, configure the second server computer system 140 to perform the method 1000 or a portion thereof.

The second server computer system 140 sends, via the communications module and to the first device, a signal causing the first device to output a message requesting information related to the request (step 1010). In this embodiment, the first device may be the electronic device 110 and as such the signal causing the first device to output the message may be sent to the first device via the first server computer system 130. Specifically, the signal is sent, via the communications module and to the first server computer system 130. The signal is processed by the first server computer system 130 and is sent to the electronic device 110, the signal causing the electronic device 110 to output a message requesting information related to the request. For example, during step 610 the request may be "Ask my bank to call me tomorrow" and as such the message requesting information related to the request may cause the first device to output "What is this regarding?"

The second server computer system 140 receives, via the communications module and from the first device, a signal including information related to the request (step 1020).

In this embodiment, the first device may be the electronic device 110 and as such the signal including information related to the request may be received from the first device via the first server computer system 130. For example, a user may be in the environment 160 and may submit input in the form of a voice utterance that includes information related to the request such as "I noticed fraudulent charges on my credit card." The voice utterance may be processed in manners similar to that described herein and the signal may be sent to the second server computer system 130.

The second server computer system 140 selects the node based at least on the information related to the request (step 1030).

Based on the information related to the request, the second server computer system 140 may select a particular node. For example, where the information related to the request is "fraudulent charges on my credit card" the second server computer system 140 may select a node that is associated with a fraud department. In this manner, rather than scheduling any node that has available bandwidth, the second server computer system 140 may select a node that is capable of handling the request based at least on the information related to the request. The particular node must, however, have available bandwidth as described herein.

As mentioned previously, the second server computer system 140 may be configured to schedule electric vehicle charging and as such each node 170 may be an electric vehicle charging station. In this embodiment, the methods and systems described herein may be used to schedule electric vehicle charging. For example, a user may wish to charge their electric vehicle at a particular time and location. The user may utilize a computing device associated with their electric vehicle to submit a request to schedule access to a shared resource (electric vehicle charging). Responsive to receiving the request, the second server computer system 140 may, based on a load projection for the shared resource, identify at least one time period where at least one electric vehicle charging station is available to charge the electric vehicle. In this manner, a user may schedule electric vehicle charging at a particular location and as such, when the user arrives at the particular location, the electric vehicle charging station is reserved for the user. In this manner, a user may reserve an electric vehicle charging station for electric vehicle charging. For example, when a user is planning a road trip, the user may select one or more locations for electric vehicle charging and may request a particular time to reserve the electric vehicle charging station at the particular locations. The user may, however, be required to pay a fee to complete the scheduling.

Other examples of shared resources that may be accessed using the methods and systems described herein include computing resources. For example, a user may wish to reserve bandwidth within a particular network at a particular time. As one example, a hotel or other establishment may provide a number of WiFi networks to their guests. A guest may, however, wish to reserve one of the WiFi networks (nodes) as a private WiFi network. As such, the above described methods and systems may be used to schedule and reserve a node having available bandwidth within the network.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer server system comprising:
a communications module;
a processor coupled with the communications module; and
a memory coupled to the processor and storing processor-executable instructions which, when executed by the processor, configure the processor to:
receive, via the communications module and from a first device, a signal including a request to schedule access to a shared resource;
identify, based on a load projection for the shared resource, at least one time period for the access to the shared resource;
determine that a current time has reached the at least one time period; and
responsive to determining that the current time has reached the at least one time period, provide access to a node of the shared resource that has available bandwidth.

2. The computer server system of claim 1, wherein the processor-executable instructions, when executed by the processor, further configure the processor to:
send, via the communications module and to the first device, a signal including the at least one time period and requesting confirmation that the at least one time period is acceptable; and
receive, via the communications module and from the first device, a signal including confirmation that the at least one time period is acceptable.

3. The computer server system of claim 2, wherein the processor-executable instructions, when executed by the processor, further configure the processor to:
responsive to receiving confirmation that the at least one time period is acceptable, update the load projection to include the scheduled access to the shared resource.

4. The computer server system of claim 1, wherein the processor-executable instructions, when executed by the processor, further configure the processor to:
obtain historical load data of the shared resource; and
analyze the historical load data to generate the load projection of the shared resource.

5. The computer server system of claim 1, wherein the processor-executable instructions, when executed by the processor, further configure the processor to:
engage an artificial intelligence component to generate the load projection of the shared resource, the artificial intelligence component trained to generate the load projection of the shared resource based at least on historical load data.

6. The computer server system of claim 1, wherein the processor-executable instructions, when executed by the processor, further configure the processor to:
receive, via the communications module and from the first device, authentication information; and
identify, based on the authentication information, one or more accounts associated with a requesting party.

7. The computer server system of claim 1, wherein the processor-executable instructions, when executed by the processor, further configure the processor to:
send, via the communications module and to the first device, a signal causing the first device to output a message requesting information related to the request;
receive, via the communications module and from the first device, a signal including information related to the request; and
select the node based at least on the information related to the request.

8. The computer server system of claim 1, wherein the first device includes a smart speaker device associated with another computer server system, the signals received from the first device are received via the other computer server system and the signals sent to the first device are sent via the other computer server system.

9. The computer server system of claim 1, wherein the access to the node of the shared resource is provided to a second device different than the first device.

10. The computer server system of claim 9, wherein, when providing access to the node of the shared resource, the processor-executable instructions, when executed by the processor, further configure the processor to:
send, via the communications module and to the second device, a signal that, when answered, connects the second device to the node of the shared resource.

11. The computer server system of claim 1, wherein the shared resource is associated with a call center and the node of the shared resource is associated with a call agent of the call center.

12. A computer-implemented method comprising:
receiving, via a communications module and from a first device, a signal including a request to schedule access to a shared resource;
identifying, based on a load projection for the shared resource, at least one time period for the access to the shared resource;
determining that a current time has reached the at least one time period; and
responsive to determining that the current time has reached the at least one time period, providing access to a node of the shared resource that has available bandwidth.

13. The computer-implemented method of claim 12, further comprising:
sending, via the communications module and to the first device, a signal including the at least one time period and requesting confirmation that the at least one time period is acceptable; and
receiving, via the communications module and from the first device, a signal including confirmation that the at least one time period is acceptable.

14. The computer-implemented method of claim 13, further comprising:
responsive to receiving confirmation that the at least one time period is acceptable, update the load projection to include the scheduled access to the shared resource.

15. The computer-implemented method of claim 12, further comprising:
obtaining historical load data of the shared resource; and
analyzing the historical load data to generate the load projection of the shared resource.

16. The computer-implemented method of claim 12, further comprising:

engaging an artificial intelligence component to generate the load projection of the shared resource, the artificial intelligence component trained to generate the load projection of the shared resource based at least on historical load data.

17. The computer-implemented method of claim 12, further comprising:
receiving, via the communications module and from the first device, authentication information; and
identifying, based on the authentication information, one or more accounts associated with a requesting party.

18. The computer-implemented method of claim 12, further comprising:
sending, via the communications module and to the first device, a signal causing the first device to output a message requesting information related to the request;
receiving, via the communications module and from the first device, a signal including information related to the request; and
selecting the node based at least on the information related to the request.

19. The computer-implemented method of claim 12, wherein the access to the node of the shared resource is provided to a second device different than the first device.

20. A non-transitory computer readable storage medium comprising computer-executable instructions which, when executed, configure a processor to:
receive, via a communications module and from a first device, a signal including a request to schedule access to a shared resource;
identify, based on a load projection for the shared resource, at least one time period for the access to the shared resource;
determine that a current time has reached the at least one time period; and
responsive to determining that the current time has reached the at least one time period, provide access to a node of the shared resource that has available bandwidth.

* * * * *